US010659471B2

(12) United States Patent
Li et al.

(10) Patent No.: US 10,659,471 B2
(45) Date of Patent: May 19, 2020

(54) METHOD FOR VIRTUAL MACHINE TO ACCESS PHYSICAL SERVER IN CLOUD COMPUTING SYSTEM, APPARATUS, AND SYSTEM

(71) Applicant: HUAWEI TECHNOLOGIES CO., LTD., Shenzhen, Guangdong (CN)

(72) Inventors: Junwu Li, Beijing (CN); Si Shen, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/262,872

(22) Filed: Jan. 30, 2019

(65) Prior Publication Data
US 2019/0173888 A1 Jun. 6, 2019

Related U.S. Application Data

(63) Continuation of application No. PCT/CN2016/094225, filed on Aug. 9, 2016.

(51) Int. Cl.
H04L 29/06 (2006.01)
H04L 29/12 (2006.01)
G06F 9/455 (2018.01)

(52) U.S. Cl.
CPC ........ H04L 63/102 (2013.01); G06F 9/45558 (2013.01); H04L 29/12 (2013.01); H04L 61/1511 (2013.01); H04L 61/2539 (2013.01); H04L 61/2557 (2013.01); H04L 61/2575 (2013.01); G06F 2009/45595 (2013.01)

(58) Field of Classification Search
CPC ... H04L 63/102; H04L 29/12; H04L 61/2575; H04L 61/2557; H04L 61/2539; H04L 61/1511; G06F 9/45558; G06F 2009/45595
See application file for complete search history.

(56) References Cited

U.S. PATENT DOCUMENTS 9,253,149 B2   2/2016 Wang
2008/0183853 A1*  7/2008 Manion ................. H04L 67/104
                                                            709/223

(Continued)

FOREIGN PATENT DOCUMENTS

CN        1414746 A     4/2003
CN      103326997 A     9/2013
(Continued)

Primary Examiner — J. Brant Murphy
(74) Attorney, Agent, or Firm — Womble Bond Dickinson (US) LLP

(57) ABSTRACT

A method for a virtual machine to access a physical server in a cloud computing system is disclosed. A cloud platform allocates, to the service deployed on the physical server, a publishing IP address and a publishing port and sends a NAT rule to an access network element of the virtual machine. When receiving a service access request for accessing the service, the access network element modifies, according to the NAT rule, a destination address of the service access request into the IP address and the port that are of the physical server, and routes the modified service access request to the physical server, so that the virtual machine can access the service on the physical server without knowing a real IP address and port of the physical server.

20 Claims, 7 Drawing Sheets

(56) References Cited

U.S. PATENT DOCUMENTS

| | | | |
|---|---|---|---|
| 2008/0201486 A1* | 8/2008 | Hsu | H04L 63/0272 709/238 |
| 2013/0047151 A1* | 2/2013 | Sridharan | G06F 9/45558 718/1 |
| 2014/0092899 A1* | 4/2014 | Krishna | H04L 61/2517 370/389 |
| 2015/0003462 A1* | 1/2015 | Wang | H04L 29/12377 370/392 |
| 2015/0256341 A1 | 9/2015 | Ye et al. | |
| 2015/0281059 A1* | 10/2015 | Xiao | H04L 45/74 709/238 |
| 2016/0241513 A1* | 8/2016 | Sridharan | G06F 9/45558 |

FOREIGN PATENT DOCUMENTS

| | | |
|---|---|---|
| CN | 103733574 A | 4/2014 |
| CN | 105227686 A | 1/2016 |
| CN | 105577723 A | 5/2016 |
| JP | 2004112018 A | 4/2004 |
| JP | 2014200010 A | 10/2014 |
| JP | 2016506107 A | 2/2016 |

\* cited by examiner

METHOD FOR VIRTUAL MACHINE TO ACCESS PHYSICAL SERVER IN CLOUD COMPUTING SYSTEM, APPARATUS, AND SYSTEM

CROSS-REFERENCE TO RELATED APPLICATIONS

This application is a continuation of International Application No. PCT/CN2016/094225, filed on Aug. 9, 2016, the disclosure of which is hereby incorporated by reference in its entirety.

TECHNICAL FIELD

The present invention relates to the field of IT technologies, and in particular, to a method for a virtual machine to access a physical server in a cloud computing system, an apparatus, and a system.

BACKGROUND

In a cloud computing environment, some services such as an Oracle database (DB) need to be directly run on a physical server due to factors such as a configuration or performance. A user logs in to a virtual machine (VM), and accesses, over a network, a physical server on which a service of the foregoing type is deployed.

In the prior art, a VM needs to obtain an IP address of a physical server to access various services on the physical server. When the VM can obtain a real IP address of a physical server or physical server cluster hosting a service, network planning information of the physical server on which the service of a cloud platform is located is exposed. A malicious user may perform a network attack on a network in which the physical server is located and a device in the network, threatening security of the cloud platform.

SUMMARY

Embodiments of the present invention describe a method for a virtual machine to access a physical server, an apparatus, and a system, to prevent the virtual machine from obtaining a real address of the physical server and threatening network security.

According to one aspect, an embodiment of the present invention provides a system for a virtual machine to access a physical server. The system includes a cloud platform, at least one physical server, at least one host, and at least one access network element. The host, the physical server, and the cloud platform communicate with each other, at least one virtual machine runs on the host, the virtual machine accesses the physical server by using the access network element, and a service is deployed on the physical server. The cloud platform allocates, to the service, a publishing IP address and a publishing port that correspond to the service, establish a correspondence between the publishing IP address and the publishing port and an IP address and a port that are of the physical server running the service, and publishes the service, so that the service is visible to the virtual machine. The cloud platform sends, to the access network element, a network address translation (NAT) rule associated with the virtual machine, where the NAT rule includes the correspondence between the publishing IP address and the publishing port and the IP address and port of the physical server running the service. The access network element receives a service access request sent by the virtual machine, replaces, according to the NAT rule, a destination address of the service access request with the IP address and the port that are of the physical server, routes the modified service access request to the physical server, and receives a service response message returned by the physical server. According to the foregoing process, the virtual machine can access the service without knowing the IP address and the port that are of the physical server on which the service is deployed. In addition, because the service may be uniquely identified by using the publishing IP address and the publishing port that correspond to the service, even if the service is deployed on different physical servers or physical server clusters having a plurality of IP addresses, different virtual machines all can access the same service by using the same publishing IP address and publishing port without paying attention to real IP addresses and ports of the physical servers or physical server clusters in which the service is actually located, thereby implementing a unified service access mode.

In a possible embodiment, a source address of the service response message is the IP address and the port that are of the physical server. When receiving the service response message returned by the physical server, the access network element may further replace, according to the NAT rule, the source address of the service response message with the publishing IP address and the publishing port that correspond to the service, and send the modified service response message to the virtual machine, so that the service response message received by the virtual machine still does not include the real address of the physical server. It should be noted that the source address of the service response message sent by the cloud platform may alternatively be directly set to the publishing IP address and the publishing port, and the access network element does not need to modify the source address. When a source address of a service response packet sent by the physical server is the real address of the physical server, the physical server does not need to be modified to be adapted to this embodiment of the present invention, thereby increasing service deployment and publishing efficiency. When the source address of the service response packet sent by the physical server is the publishing IP address and the publishing port that correspond to the service, adaptive modification needs to be performed on the physical server, and a correspondence between the service and the publishing IP address and the publishing port is recorded. When the physical server sends the service response packet, the source address of the service response packet is set to the publishing IP address and the publishing port. In this case, the access network element does not need to perform NAT translation on the source address of the service response packet, thereby increasing efficiency of accessing, by the virtual machine, the service deployed on the physical server. On the other hand, because the physical server needs to be modified to implement the solution in this embodiment of the present invention, the service deployment and publishing efficiency is reduced.

In a possible embodiment, the cloud platform may externally publish the service in a plurality of manners. It should be noted that the cloud platform has a user-oriented service presentation interface and an O&M engineer-oriented management presentation interface. A user may log in to the service presentation interface, to browse various services provided by the cloud platform, and initiate a service application. The cloud platform displays service information on the service presentation interface, and introduces the service to the user. The service information includes an external display address of the service.

In a possible embodiment, the external display address of the service may be the publishing IP address and the publishing port, or may be a domain name corresponding to the service. When the external display address is the publishing IP address and the publishing port, the virtual machine may request to access the service of the physical server by using the publishing IP address and the publishing port as the destination address. When the external display address is the domain name, the virtual machine needs to first obtain a corresponding address of the domain name. Therefore, the virtual machine initiates a domain name parsing operation to a DNS (domain name service) server, and obtains the corresponding address of the domain name from the DNS server. The corresponding address of the domain name is the publishing IP address and the publishing port. The cloud platform may send, to the DNS server by using a registration procedure in advance, a correspondence between the domain name and the publishing IP address and the publishing port that correspond to the service. Specifically, the cloud platform delivers the correspondence between the domain name and the publishing IP address and the publishing port to the domain name system DNS server. The virtual machine is configured to: initiate the domain name parsing operation, and obtain, based on the domain name, the publishing IP address and the publishing port that correspond to the service from the DNS server.

In a possible embodiment, the user logs in to the service presentation page, and applies to the cloud platform for the service. The cloud platform returns a service application response to the virtual machine. The service application response carries the external display address.

In a possible embodiment, for a service application request of the user, after determining service authorization is approved, the cloud platform records authorization information of a user to which the virtual machine belongs. The authorization information of the user includes a user identifier, a virtual machine identifier, and an account and a password that are allocated to the user. The cloud platform may use the recorded authorization information to authenticate the service access request of the user.

In a possible embodiment, the cloud platform may perform service authorization by using the user as granularity. To be specific, when the user has a plurality of virtual machines, the user may access an authorized service by using any one of the virtual machines. When the user creates a new virtual machine, the cloud platform delivers the NAT rule to an access network element to which the new virtual machine connects, so that the user may normally access the service on the physical server by using the new virtual machine. Service authorization performed by using the user as granularity may bring about great convenience to the user, so that the user does not need to apply for service authorization separately for each virtual machine. Still further, when the user deletes any one of the virtual machines belonging to the user, the cloud platform instructs the access network element to delete the NAT rule associated with the virtual machine when deleting the virtual machine.

The user may proactively request to terminate the service authorization or the cloud platform may proactively terminate the service authorization for the user when the user is in debt. When the cloud platform determines that the service authorization for the user needs to be terminated, the cloud platform determines an associated virtual machine, and sends a deletion message to the access network element to which the virtual machine connects, to instruct the access network element to delete the NAT rule of the virtual machine.

The cloud platform may further have a service detection/collection capability. When a new service is deployed on the physical server, the cloud platform may obtain, in a timely manner, service information and information about the physical server on which the service is deployed.

In a possible embodiment, the physical server is a single physical server or a physical server cluster.

According to another aspect, an embodiment of the present invention provides a method for a virtual machine to access a physical server in a cloud computing system, and a cloud platform performs the operations in the foregoing system.

According to still another aspect, an embodiment of the present invention provides another method for a virtual machine to access a physical server in a cloud computing system, and an access network element performs the operations in the foregoing system.

Corresponding to the foregoing system and method, this embodiment of the present invention provides a cloud platform. The cloud platform has a function of implementing the cloud platform defined in the foregoing system. The function may be implemented by hardware, or may be implemented by hardware executing corresponding software. The hardware or software includes one or more modules corresponding to the foregoing function.

Corresponding to the foregoing system and method, this embodiment of the present invention further provides a host, and a virtual machine and an access network element that are defined in the system run on the host. The access network element may be a virtual machine network element such as openvswitch, or, the access network element may be implemented by hardware, and is specifically a top-of-rack switch on the host. The host has a function of implementing the access network element defined in the system. Further, the host may further have a function of implementing the virtual machine defined in the system. The function may be implemented by hardware, or may be implemented by hardware executing corresponding software. The hardware or software includes one or more modules corresponding to the foregoing function.

In a possible embodiment, the cloud platform and the host are implemented by a general server or a dedicated server. A structure of the server includes a processor, a memory, a system bus, and an input/output interface. The processor is configured to support a corresponding function of the cloud platform or the host in the system. The input/output interface is configured to communicate with another component in the cloud computing system, and the processor executes an instruction stored in the memory.

According to yet another aspect, an embodiment of the present invention provides a computer storage medium, configured to store a computer software instruction used by the foregoing cloud platform. The computer software instruction includes a program designed for performing the foregoing aspect.

According to yet another aspect, an embodiment of the present invention provides a computer storage medium, configured to store a computer software instruction used by the foregoing host. The computer software instruction includes a program designed for performing the foregoing aspect.

Compared with the prior art, according to the solutions provided in the embodiments of the present invention, the real address of the physical server on which the service is deployed may be shielded from the virtual machine, and a unified access mode is also provided to the virtual machine, thereby both ensuring network security of the cloud platform and improving convenience of accessing the service by the user.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description merely show some embodiments of the present invention, and a person of ordinary skill in the art can derive other implementations from these accompanying drawings without creative efforts. All of the embodiments or the implementations shall fall within the protection scope of the present invention.

DESCRIPTION OF EMBODIMENTS

The technical solutions according to embodiments of the present invention are clearly described in the following with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Network architectures and service scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are also applicable to a similar technical problem.

Figure 1A:
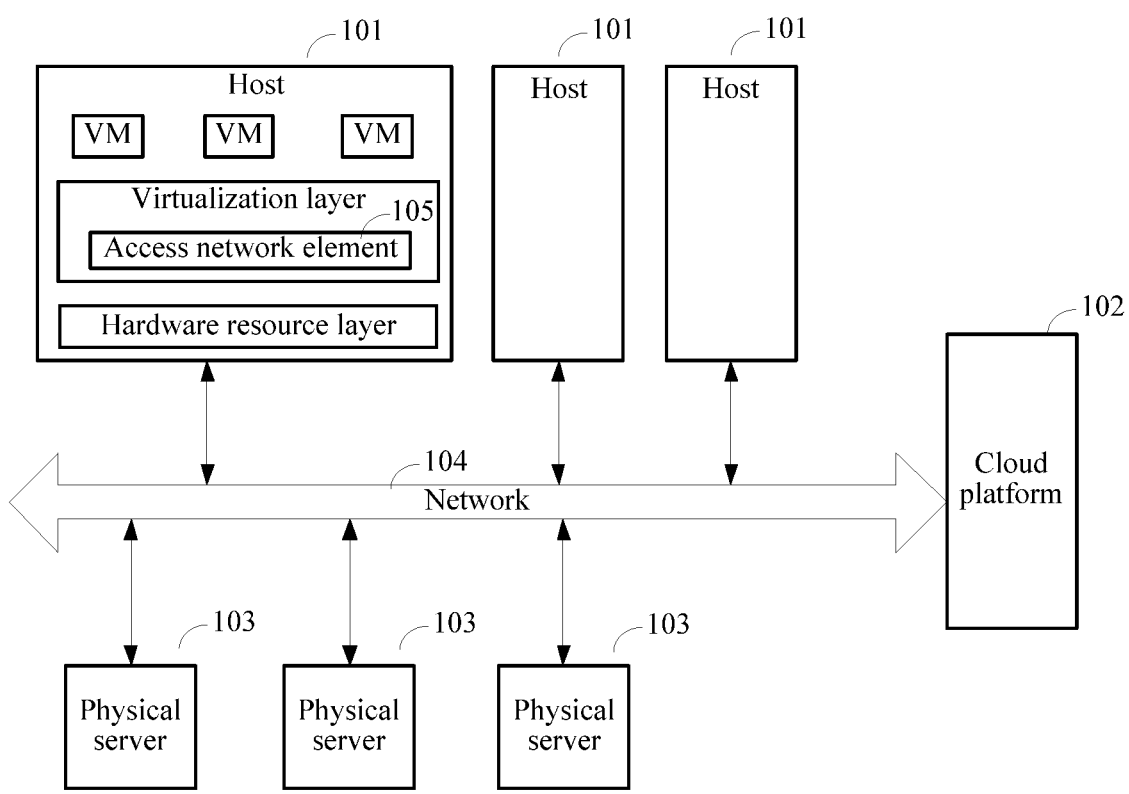
FIG. 1A is a schematic diagram of a network architecture of a cloud computing system according to an embodiment of the present invention.
Figure 1B:
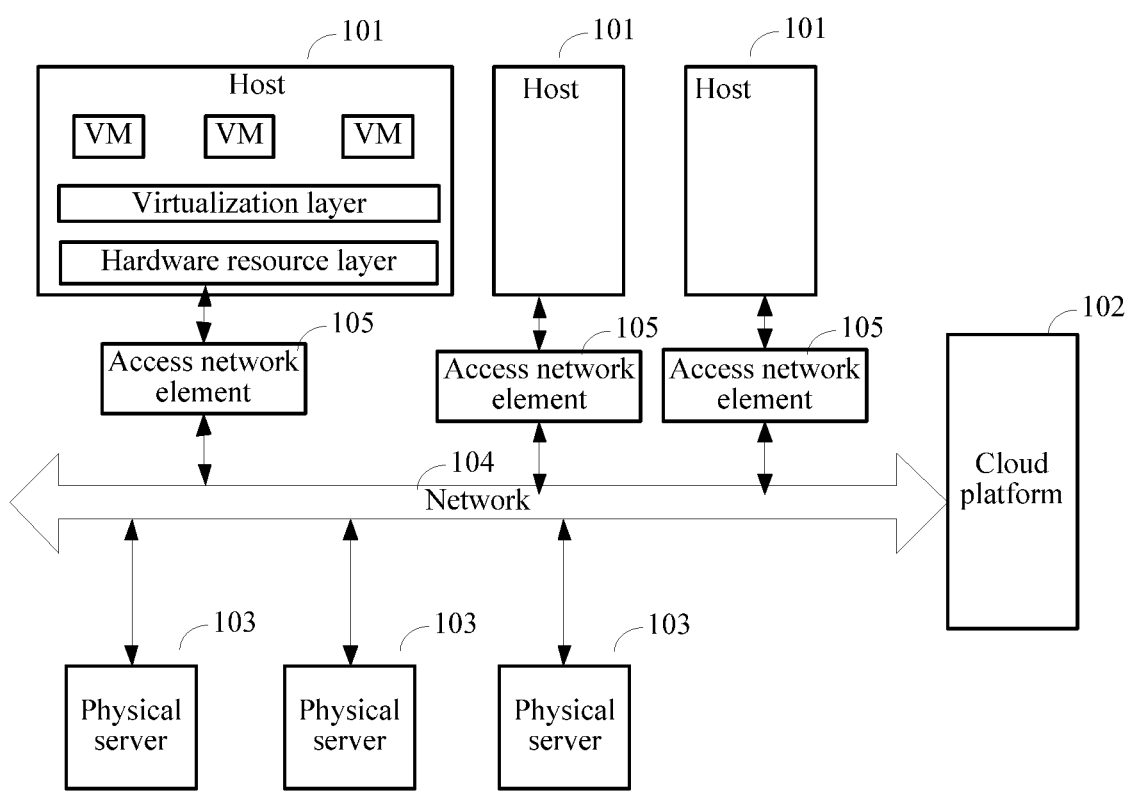
FIG. 1B is a schematic diagram of a network architecture of another cloud computing system according to an embodiment of the present invention.

FIG. 1A and FIG. 1B are each a diagram of a network architecture of a cloud computing system according to the embodiments of the present invention. The cloud computing system includes a host 101, a cloud platform 102, a physical server 103, a network 104, and an access network element 105. Several virtual machines run on the host 101. The virtual machine connects to the network 104 and accesses the cloud platform 102 and the physical server 103, by using the access network element 105.

The virtual machine running on the host 101 carries a service of a user. The user logs in to the virtual machine by using a client, and accesses, by using the network 104, various services externally published by the cloud platform 102. The service is a service run on the physical server 103, for example, a database service. From a perspective of a structure, the cloud computing system may be divided into an infrastructure as a service (IAAS) layer, a platform as a service (PAAS) layer, and a software as a service (SAAS) layer. A service deployed on the physical server 103 is usually a PAAS layer service.

The cloud platform 102 is a management end of the cloud computing system, and is configured to manage an underlying device and a service that are provided by a cloud computing provider, including managing resources such as a computing resource, a network resource, and a storage resource, monitoring operation and maintenance, and so on. The cloud platform 102 further includes a user-oriented service presentation page and an administrator-oriented management presentation page. The administrator configures and manages a service deployed on the physical server, by using the management presentation page. When the service is deployed, the user logs in to the service presentation page of the cloud platform 102, and checks an available service. Service information displayed on the service presentation page includes an external display address of the service. When the VM needs to access the service, the VM initiates, by using the external display address, a request to access the service. The external display address may uniquely identify the service deployed on the physical server. The external display address may be specifically a publishing IP address and a publishing port that correspond to the service, or may be a domain name corresponding to the service.

The cloud platform 102 establishes a correspondence between the publishing IP address and the publishing port that correspond to the service and a real address of the physical server 103 on which the service is deployed, and delivers the correspondence to the access network element 105 of each virtual machine. When the external display address of the service is the publishing IP address and the publishing port, the virtual machine initiates a service access procedure by using the publishing IP address and the publishing port as a destination address of a service access request. When the external display address of the service is the domain name corresponding to the service, the virtual machine needs to first initiate a domain name parsing procedure, and obtains the corresponding publishing IP address and publishing port of the domain name from a DNS server; then initiates a service access procedure by using the publishing IP address and the publishing port as a destination address of a service access request. It should be noted that when the external display address of the service is the domain name corresponding to the service, after the service is deployed, the cloud platform 102 is further configured to deliver a correspondence between the domain name and the publishing IP address and the publishing port to the domain name system DNS server. The DNS server is provided for internal use of the cloud computing system. The DNS server connects to the host 101 and the cloud platform 102 by using the network 104.

In a specific implementation scenario, according to one embodiment, the cloud platform 102 includes a software-defined networking (SDN) controller. Preferably, the SDN controller in the cloud platform 102 obtains a network topology of the virtual machine, and delivers a network address translation (NAT) rule to the access network element 105 of the virtual machine in a flow table form. The NAT rule includes a correspondence between the publishing IP address and the publishing port and an IP address and a port that are of the physical server 103 running the service.

The publishing IP and the publishing port are specifically an IP and a port that correspond to the service. To be specific, a service may be uniquely determined by using the publishing IP address and the publishing port. The publishing IP may use a reserved address. The reserved address is an IP address that cannot be used by a data service network, for example, 169.254.*.*. The publishing port may use a well-known port, and a well-known port number is a port number reserved by the Internet Corporation for Assigned Names and Numbers (ICANN) for the Transmission Control Protocol (TCP) and the User Data Protocol (UDP). For example, 169.254.169.254+3306 may be used to represent an access address of a database service.

In this embodiment of the present invention, for different users, an external display address of a same service is the same.

The cloud platform 102 may have the following functions:

an O&M function for configuring and managing, by the administrator, a service by using the management presentation interface provided by the cloud platform 102;

a monitoring function for monitoring the physical server in real time, to obtain information about service online/offline;

a network information obtaining function for obtaining the network topology of the virtual machine running on the host 101 and obtaining the IP address and the port that are of the physical server 103 running the service; and a service publishing function for presenting service information to the user by using the service presentation interface.

Further, the cloud platform 102 may further have functions such as service charging and alarm.

The physical server 103 is a physical server on which the service is deployed, and may be a single physical server or a server cluster. The virtual machine connects to the physical server 103 by using the network 104, to access the service run on the physical server 103. It should be noted that when the physical server 103 is a physical server cluster, a real address of the physical server on which the service is deployed is an externally presented address of the physical server cluster. For example, when the cluster is in an A-P mode, active/standby physical servers have a same address, and the same address is the externally presented address of the physical server cluster. Alternatively, when a plurality of physical servers form a cluster, a virtual IP address of a master node in the externally presented cluster is used as the externally presented address of the physical server cluster. When the service access request of the virtual machine is routed to the externally presented address of the physical server cluster, a server in the cluster may provide the service in a load balancing manner. It should be noted that an implementation form of the server cluster is not limited in this embodiment of the present invention, provided that the service access request can be routed to the server cluster by using the externally presented address of the server cluster. An implementation of internal load balancing of the server cluster may use various solutions in the prior art.

When receiving the service access request from the virtual machine, the physical server 103 processes the service access request, and returns a service access response. For example, the service access request may be a database query request initiated by the virtual machine, and the database query request is used to query data by using a database service deployed on the physical server 103. The database query request may carry a query condition. When the database query request is routed to the physical server 103, the physical server 103 generates a query result based on the query condition, adds the query result to the service access response, and returns the service access response to the virtual machine. It should be noted that in this embodiment of the present invention, a type and an objective of the service access request are not limited, and a specific method for processing the service access request by the physical server 103 is not limited either. Various common service access requests in the prior art are all applicable in this embodiment of the present invention. Various methods for processing the service access request by the physical server that are disclosed in the prior art may also be directly used in this embodiment of the present invention.

The access network element 105 may be a virtual network element (for example, Open vSwitch) running on the host 101 or a top-of-rack (TOR) switch of the host. The access network element 105 connects to the virtual machine, and provides a network access capability to the virtual machine. The access network element 105 may be located at a virtualization layer of the host 101, as shown in FIG. 1A; or may be a top-of-rack switch physically connected to the host 101, as shown in FIG. 1B. The top-of-rack switch is an independent hardware device. In a specific application scenario, the host may have an exclusive top-of-rack switch, a plurality of hosts may share one top-of-rack switch, or a plurality of hosts share a plurality of top-of-rack switches. This is not limited in this embodiment of the present invention.

The NAT rule associated with the virtual machine is configured on the access network element. The NAT rule includes the correspondence between the publishing IP address and the publishing port that correspond to the service and the IP address and the port that are of the physical server. Further, the NAT rule may be specific to both an egress direction of the VM and an ingress direction of the VM. It should be noted that in the embodiments of the present invention, the IP address and the port that are of the physical server are a real IP address and port of the physical server, to distinguish the IP address and the port from the publishing IP address and the publishing port that correspond to the service.

In a possible embodiment, the NAT rule may be implemented by using iptables in a Linux system or a flow table delivered by the SDN controller. A specific implementation is not limited in this embodiment of the present invention.

In one scenario, according to one embodiment, a VM at an IAAS layer of a cloud platform vendor accesses, by using a network, a PAAS service run on a physical server. When the IAAS and the PAAS are provided by different vendors, for the PAAS service run on the physical server, decoupling of the IAAS and the PAAS may be implemented, facilitating rapid integration of the IAAS and the PAAS.

According to one embodiment of the present invention, the real address of the physical server can be invisible to the virtual machine, thereby shielding the physical server from a network attack of the virtual machine, and improving security of the cloud computing system. For different users, the physical server externally presents the same external display address. Therefore, in this embodiment of the present invention, a same access mode may be provided to the different users to access the service run on the physical server, thereby implementing access address normalization, and increasing efficiency of publishing, by the cloud platform, a new service deployed on the physical server.

In a possible embodiment, the cloud platform may control deployment of the physical server. After a service is run on the physical server, the cloud platform publishes information about the service run on the physical server. The user may check the published service by using the service presentation interface provided by the cloud platform, and initiates a service application. The cloud platform approves or rejects the service application of the user. If the service application is approved, authorization information is returned to the user. The authorization information may include a user identifier, a virtual machine identifier, permission, an account and a password that are allocated to the user, and the like. Information about the user is recorded in the cloud platform, and includes information about each virtual machine used by the user. The cloud platform may authorize the user to access the service on the physical server by using the user as granularity. In this case, each virtual machine of the user may access the server. The cloud platform may alternatively authorize the user to access the service on the physical server by using the virtual machine as granularity. To be specific, the cloud platform authorizes the user to access the service by using a particular virtual machine. In the foregoing manner, the cloud platform may determine a list of authorized virtual machines. The cloud platform delivers the NAT rule to the access network element to which each authorized virtual machine connects. The external display address of the service is translated into the real IP address and port of the physical server by using the NAT rule, so that the virtual machine of the user accesses the service of the physical server. The access network element may be a mounted network element or a Network Virtualization Edge of the virtual machine.

Figure 2:
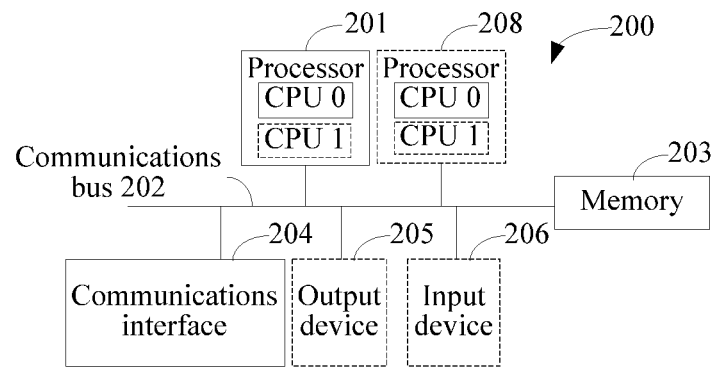
FIG. 2 is a schematic diagram of a hardware structure of a computer device according to an embodiment of the present invention.

The cloud platform, the host, the physical server on which the service is deployed, and the access network element in the cloud computing system shown in FIG. 1A and FIG. 1B may be implemented by hardware/software. For example, FIG. 2 is a schematic diagram of a hardware structure of a computer device according to an embodiment of the present invention. The computer device 200 includes at least one processor 201, a communications bus 202, a memory 203, and at least one communications interface 204.

The processor 201 may be a general central processing unit (CPU) or a microprocessor, and execute an instruction in the memory 203, to implement functions of the foregoing devices.

The communications bus 202 may include a path for transmitting information between the foregoing components. The communications interface 304 is a type of apparatus that uses any transceiver, and is configured to communicate with other devices or communications networks such as the Ethernet, a radio access network (RAN), and a wireless local area network (WLAN).

The memory 203 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), or a magnetic disk storage medium, another magnetic storage device, or any other medium that can be configured to carry or store expected program code in a form of an instruction or a data structure and that can be accessed by a computer, but is not limited thereto. The memory may independently exist and be connected to the processor by using the bus.

The memory 203 is configured to store application program code for performing this solution of the present invention, and the processor 201 controls the performing. The processor 201 is configured to execute the application program code stored in the memory 203.

During specific implementation, in an embodiment, the processor 201 may include one or more CPUs, for example, a CPU 0 and a CPU 1 in FIG. 2.

During specific implementation, in an embodiment, the computer device 200 may include a plurality of processors, for example, a processor 201 and a processor 208 shown in FIG. 2. Each of these processors may be a single-core processor, or may be a multi-core processor. The processor herein may be one or more devices or circuits, and/or processing cores configured to process data (for example, a computer program instruction).

During specific implementation, in an embodiment, the computer device 200 may further include an output device 205 and an input device 206. The output device 205 communicates with the processor 201, and may display information in various manners. For example, the output device 205 may be a liquid crystal display (LCD), a light-emitting diode (LED) display device, a cathode ray tube (CRT) display device, a projector, or the like. The input device 206 communicates with the processor 201, and may receive an input of a user in various manners. For example, the input device 206 may be a mouse, a keyboard, a touchscreen device, a sensing device, or the like.

The computer device 200 may be a general-purpose computer device or a special-purpose computer device. During specific implementation, the computer device 200 may be a desktop computer, a portable computer, a network server, a personnel digital assistant (PDA), a mobile phone, a tablet computer, a wireless terminal device, a communications device, an embedded device, or a device having a structure similar to that in FIG. 2. In this embodiment of the present invention, a type of the computer device 200 is not limited.

The cloud platform, the host, the physical server on which the service is deployed, and the access network element in FIG. 1A and FIG. 1B may be the device shown in FIG. 2. The memory stores one or more software modules, configured to implement functions (for example, a NAT translation function) of the cloud platform, the host, the physical server on which the service is deployed, and the access network element. The cloud platform, the host, the physical server on which the service is deployed, and the access network element may implement, by using the processor and program code in the memory, the method for a virtual machine to access a service deployed on the physical server.

It should be noted that the computer device in FIG. 2 gives only a possible hardware implementation of each component in the cloud computing system. Based on a difference or a change of a function of each component of the system, a hardware component of the computer device may be added or deleted, so that the computer device matches the function of each component of the system.

Figure 3:
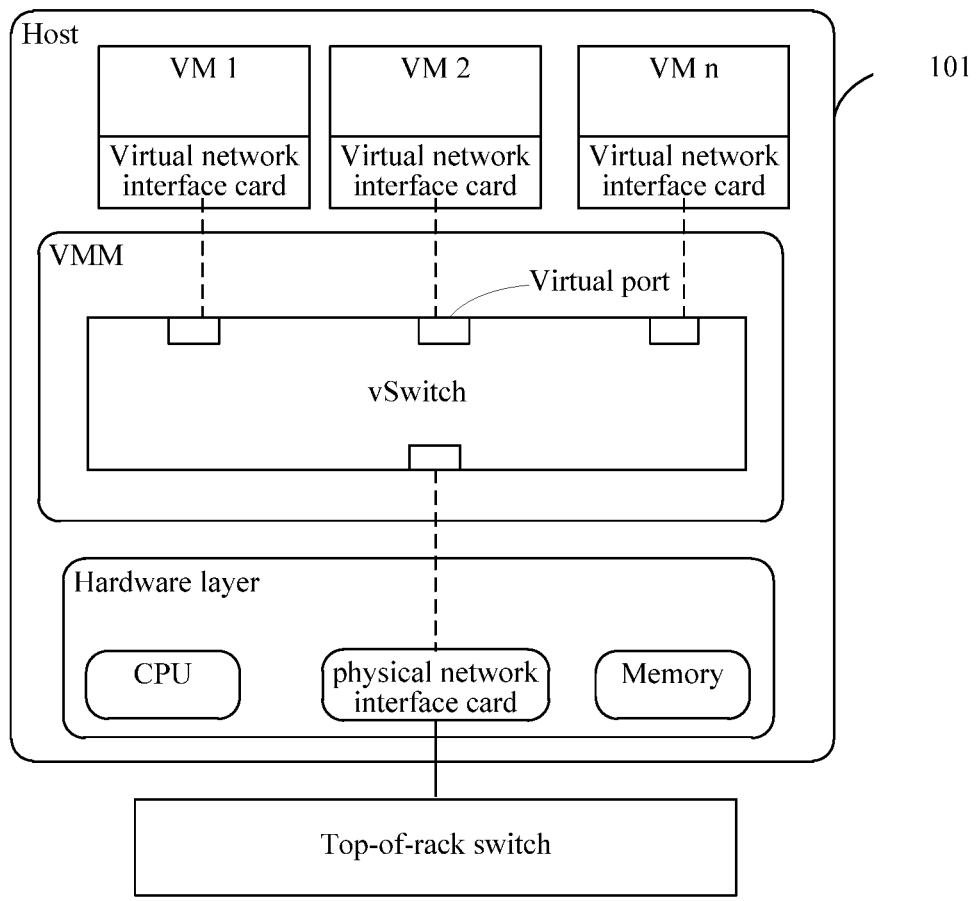
FIG. 3 is a schematic diagram of a virtualization structure on a host according to an embodiment of the present invention.

FIG. 3 is a schematic diagram of a virtualization structure on a host according to an embodiment of the present invention. The host is a physical server. A bottom layer of the host is a hardware layer. The hardware layer mainly includes hardware resources such as a central processing unit (CPU), a memory, a hard disk, and a physical network interface card. Server virtualization means that a virtualization operating environment of a plurality of virtual machines (VM) is implemented with the help of virtualization software (for example, VMWare ESX and Citrix XEN) on the physical server. A software layer that is mounted on the server and that implements the virtualization environment is referred to as a virtual machine monitor (VMM). The VMM running on the hardware layer is responsible for scheduling, allocation, and management of hardware resources in the hardware layer. A plurality of virtual machine VMs run on the VMM. The VMM provides hardware environments such as a virtual CPU, memory, storage, I/O device (for example, a physical network interface card), and Ethernet switch to each virtual machine, thereby ensuring that the plurality of virtual machines are separated from each other and run.

In the virtualization operating environment, the VMM creates a virtual network interface card (vNIC) for each virtual machine. A virtual switch vSwitch provides a communication capability between the virtual machines and between the virtual machines and an external network. For the vSwitch running in the VMM, the virtual network interface card of each virtual machine corresponds to a virtual port of the vSwitch. The physical network interface card of the host corresponds to a port on which the vSwitch is connected to an external top-of-rack switch. In FIG. 3, a dashed line represents a logical connection in a virtual network, and a solid line represents a physical connection.

In a possible embodiment, a function of the foregoing access network element is implemented by the virtual switch (vSwitch). A cloud platform sends a NAT rule of the virtual machine to the virtual switch. The virtual switch configures the NAT rule on a virtual port on which the virtual switch is connected to the virtual machine. When receiving a service access request from the virtual machine, a virtual switch modifies, by using the NAT rule, a destination address of the service access request into a publishing IP address and a publishing port that correspond to the service, so that a packet access request is routed to the physical server on which the service is deployed.

In another possible embodiment, a function of the foregoing access network element is implemented by the top-of-rack switch connected to the host. A cloud platform sends a NAT rule of the virtual machine to the top-of-rack switch, and configures the NAT rule of the virtual machine on the top-of-rack switch. When receiving a service access request from the virtual machine, the top-of-rack switch modifies, by using the NAT rule, a destination address of the service access request into a publishing IP address and a publishing port that correspond to the service, so that a packet access request is routed to the physical server on which the service is deployed.

It should be noted that regardless of whether the NAT rule is deployed on the virtual network element of the host or on the top-of-rack switch, a same function is implemented. To be specific, NAT translation is performed on an address of the physical server. In an egress direction of the VM, a destination address of a packet is modified into the publishing IP address and the publishing port that correspond to the service. In an ingress direction of the VM, a source address of the packet is modified into the publishing IP address and the publishing port that correspond to the service. A routing procedure of the packet between the host and the physical server is performed in a manner defined according to an existing standard. This is not limited in this embodiment of the present invention, provided that the packet can be routed to the physical server based on the publishing IP address and the publishing port.

Figure 4:
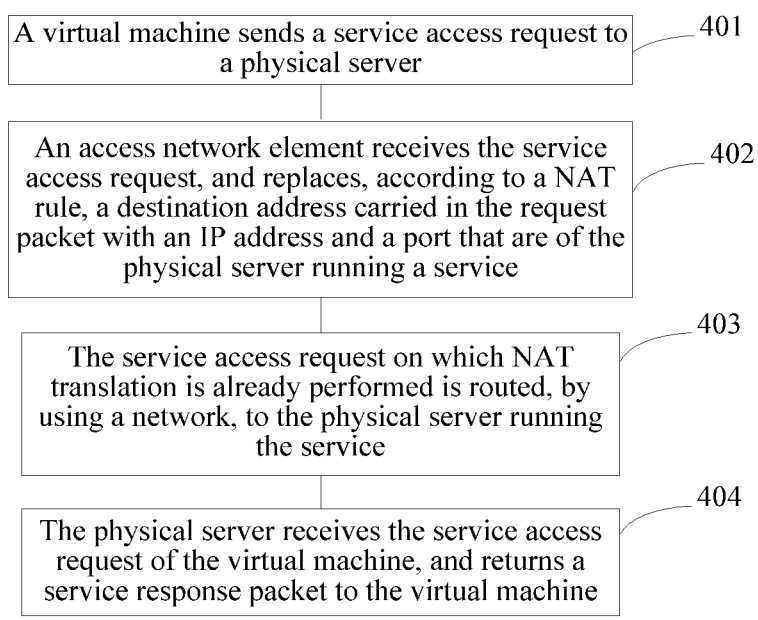
FIG. 4 is a flowchart of packet forwarding and processing of a virtual machine accessing a physical server according to an embodiment of the present invention.

With reference to the system architectures in FIG. 1A and FIG. 1B, FIG. 4 shows a packet forwarding and processing procedure of a virtual machine accessing a physical server according to an embodiment of the present invention. The procedure includes the following operations.

Operation 401: An external display address of a service run on the physical server is visible to the virtual machine, and the virtual machine sends a service access request to the physical server. A destination address of the service access request is a publishing IP address and a publishing port that correspond to the service.

In a possible implementation scenario, in one embodiment the external display address includes the publishing IP address and the publishing port. The publishing IP address and the publishing port may uniquely identify the service run on the physical server.

In another possible implementation scenario, according to one embodiment, the external display address is a domain name. The domain name may uniquely identify the service run on the physical server. The virtual machine initiates a domain name parsing operation for the domain name, and obtains the publishing IP address and the publishing port that correspond to the service run on the physical server.

After obtaining the publishing IP address and the publishing port that correspond to the service run on the physical server, the virtual machine initiates the service access request by using the publishing IP address and the publishing port as the destination address.

Operation 402: An access network element receives the service access request, and replaces, according to a NAT rule, the destination address carried in the request packet with an IP address and a port that are of the physical server running the service, where the NAT rule includes a correspondence between the IP address and the port that are of the physical server running the service and the publishing IP address and the publishing port that correspond to the service.

In a possible embodiment, the NAT rule may be specifically a flow table delivered by an SDN controller in the cloud platform.

Operation 403: The service access request on which NAT translation is already performed is routed, by using a network, to the physical server running the service.

Operation 404: The physical server receives the service access request of the virtual machine, and returns a service response packet to the virtual machine.

On one hand, a source address of the service response packet sent by the physical server may be the publishing IP address and the publishing port that correspond to the service. When receiving the service response packet, the access network element does not need to perform NAT translation on the source address of the service response packet. In this way, it may be ensured that the virtual machine cannot obtain a real address of the physical server. It should be noted that the physical server needs to perform modification to record the publishing IP address and the publishing port that correspond to the service, and set the source address of the returned response packet to the publishing IP address and the publishing port. Although the modification reduces deployment efficiency of the physical server, because the access network element does not need to replace the source address of the service response packet after receiving the service response packet, efficiency of accessing the service on the physical server by the virtual machine can be increased.

On the other hand, the source address of the service response packet sent by the physical server may be a real IP address and port of the physical server. The service response packet is routed to the access network element by using the network. The access network element replaces, according to the NAT rule, the source address of the service response packet with the publishing IP address and the publishing port that correspond to the service, and returns the service response packet to the virtual machine. According to the foregoing processing procedure, it may be ensured that the virtual machine cannot obtain the real address of the physical server without modifying the physical server.

According to the foregoing service access procedure, the virtual machine may access the physical server running the service. A same service has a same external display address, so that an access mode of virtual machines is unified. In addition, the real address of the physical server is invisible to the virtual machine, thereby ensuring network security of the physical server.

When a user to which the virtual machine belongs applies to terminate the service or the service is terminated because the user is in debt, the cloud platform deletes recorded authorization information of the user, terminates service authorization, and instructs the access network element to which the virtual machine connects to delete a NAT rule associated with the user.

Further, in a virtual machine migration scenario, when the virtual machine is migrated from a host 1 to a host 2, the NAT rule corresponding to the virtual machine is also dynamically migrated. The dynamic migration may be specifically implemented by using a migration tool or may be implemented in a manner in which the SDN controller dynamically delivers an OpenFlow flow table, or may be implemented in another manner, thereby ensuring that the virtual machine can continuously access the service on the physical server during migration. In a possible design, an access network element of the virtual machine before the migration establishes a connection to an access network element of the virtual machine after the migration, and sends the NAT rule corresponding to the virtual machine to the access network element of the virtual machine after the migration. In another possible design, the SDN controller obtains an address of an access network element of the virtual machine after the migration, and delivers, to the access network element after the migration, the NAT rule in a form of a flow table, thereby ensuring that the virtual machine can normally access the service after the migration. To ensure continuous service access of the virtual machine in a migration process, a tool such as Conntrackd may be used to transfer status information of the virtual machine to the host 2.

It should be noted that the physical server running the service may be a single physical server, or may be a physical server cluster having high availability. The server cluster may be implemented based on an existing tool or protocol and based on a performance requirement of the service. This is not limited in this embodiment of the present invention. When the physical server is a server cluster, the physical server may be specifically a shared service cluster or a single-instance service cluster. The shared service cluster provides a cluster of physical servers whose services are based on user access rights and are separated from each other, and the single-instance service cluster provides a cluster of physical servers whose services are based on user access rights but cannot be separated from each other. For the different physical server clusters, the service access method provided in this embodiment of the present invention is applicable.

Figure 5:
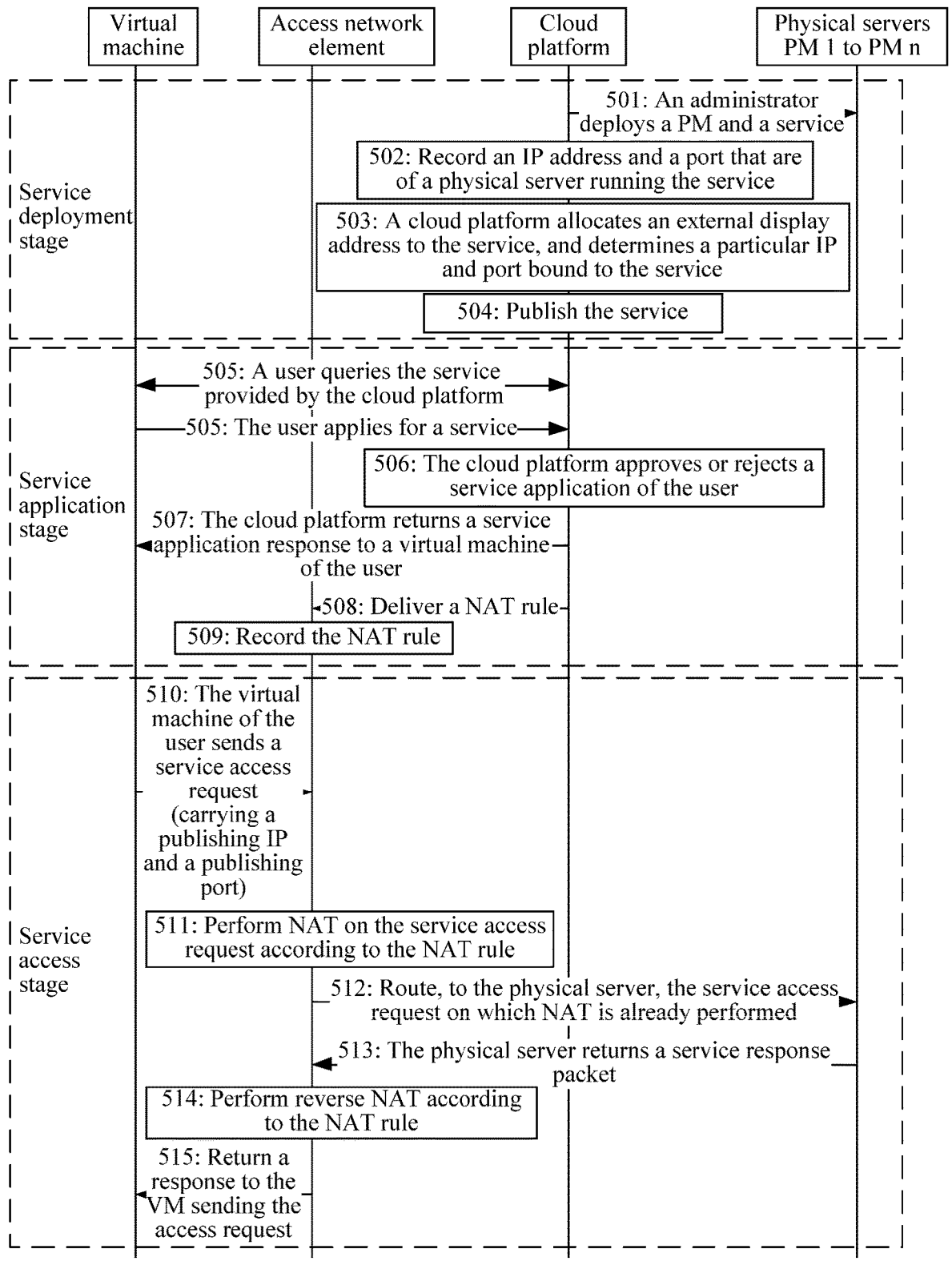
FIG. 5 is a schematic flowchart of a virtual machine accessing a service run on a physical server according to an embodiment of the present invention.

An embodiment corresponding to FIG. 5 provides a schematic flowchart of a virtual machine accessing a service run on a physical server. The procedure includes a service deployment stage, a service application stage, and a service access stage.

Cloud Service Deployment Stage:

Operation 501: After the physical server is online, one or more services provided to the virtual machine are deployed on the physical server.

The service may be deployed on a single physical server, or may be deployed on a physical server cluster having high availability. A cloud platform administrator configures the physical server and deploys the service on the physical server, by using a management presentation interface. A specific procedure may use an existing solution. This is not limited in this embodiment of the present invention.

Operation 502: A cloud platform records an IP address and a port that are of the physical server running the service.

When the service is deployed on a single physical server, the virtual machine accesses the single physical server to access the service. When the service is deployed on a physical server cluster, the IP address and the port that are of the physical server running the service and recorded by the cloud platform are an IP address and a port that are externally presented by the physical server cluster. For example, when the cluster is in an A-P mode, active/standby physical servers have the same IP address and port. The same IP address and port are an address externally presented by the physical server cluster. Alternatively, when a plurality of physical servers form a cluster, a virtual IP address and a virtual port that are of a master node in the externally presented cluster are used as an address externally presented by the physical server cluster.

It should be noted that different services correspond to different ports. When a plurality of services are deployed on a same physical server, different services may be distinguished based on ports.

Operation 503: The cloud platform allocates an external display address to the service. The external display address may uniquely identify the service. In a possible implementation scenario, the external display address includes a publishing IP address and a publishing port. In another possible implementation scenario, the external display address is a domain name corresponding to the service. The cloud platform allocates a publishing IP address and a publishing port to the service, and establishes a mapping relationship between the domain name and the publishing IP address and the publishing port.

In a possible embodiment, the cloud platform records an association relationship among the IP address and the port that are of the physical server, an identifier of the service run on the physical server, and the publishing IP address and the publishing port that correspond to the service. Still further, when the external display address is the domain name corresponding to the service, the association relationship may further include the domain name corresponding to the service.

Operation 504: After the service is deployed, the cloud platform externally publishes service information. The service information includes the external display address of the service.

Service Application Stage

Operation 505: A user queries the service provided by the cloud platform, and initiates a service application request to the cloud platform.

A service presentation interface of the cloud platform is visible to the user. The user logs in to the service presentation interface by using the virtual machine, quires the service information, and initiates the service application request to the cloud platform. The service application request may carry an identifier of a to-be-applied service, a user identifier and a virtual machine identifier, and the like. It should be noted that content carried in the service application request is not limited in this embodiment of the present invention, provided that the cloud platform can obtain information required for approval of the service from the service application request.

Operation 506: The cloud platform approves or rejects the service application request, and after approving the service application request, the cloud platform records authorization information of the user. The authorization information includes the user identifier, the virtual machine identifier, permission, and an account and a password that are allocated to the user, and the like.

After receiving a service application of the user, the cloud platform may automatically approve or reject the service application or an administrator may manually approve or reject the service application. For a rejected service application, a failure cause is returned to the virtual machine. When the service application request is approved, the cloud platform returns the authorization information to the virtual machine.

It should be noted that service authorization may be performed by using the user as granularity. To be specific, when the service application request of the user is approved, all virtual machines belonging to the user may access the service. In this case, the authorization information may not include the virtual machine identifier. Service authorization may be performed by using the virtual machine as granularity. To be specific, the user may be permitted to access the service only by using an approved virtual machine. In this case, the authorization information may not include the user identifier. Permission in the authorization information is operation permission of accessing the service by the user. For example, based on permission in the authorization information, the user may be permitted to have only query permission of a database service, or the user is granted with update permission for a database service.

Operation 507: The cloud platform returns a service application response to the virtual machine. When the service application request from the virtual machine is approved, the service application response includes the external display address of the service, the authorization information, and the like.

Operation 508: The cloud platform delivers a NAT rule to an access network element of the virtual machine. The NAT rule includes a correspondence between the IP address and the port that are of the physical server running the service and the publishing IP address and the publishing port that correspond to the service.

Operation 509: The access network element of the virtual machine receives and records the NAT rule, used for subsequent processing of a data packet.

Service Access Stage

Operation 510: The virtual machine sends a service access request. A destination address of the service access request is the publishing IP address and the publishing port that correspond to the service.

It should be noted that the external display address of the service may be the domain name. After the service is deployed, the cloud platform may send, to the domain name system DNS server by using a registration procedure, a correspondence between the domain name and the publishing IP address and the publishing port that correspond to the service. The virtual machine is configured to: initiate a domain name parsing operation, and obtain, based on the domain name, the publishing IP address and the publishing port that correspond to the service from the DNS server. The DNS server is an internal DNS server of the cloud computing system.

Operation 511: The access network element receives the service access request, and replaces, according to the NAT rule, the destination address of the service access request with the IP address and the port that are of the physical server running the service. The NAT rule includes the correspondence between the IP address and the port that are of the physical server running the service and the publishing IP address and the publishing port that correspond to the service.

Operation 512: The service access request on which NAT translation is already performed is routed, by using a network, to the physical server running the service.

Operation 513: The physical server receives the service access request of the virtual machine, and returns a service response packet. A source address of the service response packet is the IP address and the port that are of the physical server.

Operation 514: The service response packet is routed to the access network element by using the network.

Operation 515: The access network element replaces, according to the NAT rule, the source address of the service response packet with the publishing IP address and the publishing port that correspond to the service, and returns the service response packet to the virtual machine.

According to the method for a virtual machine to access a physical server provided in this embodiment of the present invention, a real IP address of the physical server on which the service is deployed may be shielded from the virtual machine, and a unified access mode is also provided to the virtual machine, thereby both ensuring network security of the cloud platform and improving convenience of accessing the service by the user. Further, a same access mode is configured for a same service, so that complexity of deploying, operating, maintaining, and managing the service on the physical server is reduced, and the user does not need to pay attention to functions such as online, O&M (operations & maintenance), upgrade, and high availability of the service provided by the physical server. A tunnel technology such as VXLAN (virtual extensible local area network) does not need to be used in the foregoing service access procedure, and transmission efficiency is higher. The access network element to which each virtual machine connects performs the NAT rule, thereby increasing concurrent processing efficiency of securely accessing a PAAS service by a mass of users.

It should be noted that the user may log in to the service presentation interface provided by the cloud platform, to check the service information and initiate the service application. The cloud platform may perform authentication on the service application from the virtual machine. The authentication may be specifically performed by using an account and a password or in another manner. This is not limited in this embodiment of the present invention.

The cloud platform may control access of the virtual machine to the service, by using the user, the virtual machine, or the host as granularity. For example, the cloud platform performs service authorization for the user, and all virtual machines belonging to the user may access the service; or the cloud platform performs service access authorization for the virtual machine, and each virtual machine accesses the service of the physical server by using a different IP; or a plurality of virtual machines on a host share an IP, and for the service that presents a same IP address to the cloud platform and that is connected to the physical server, the plurality of virtual machines on the same host may be distinguished by using different packet ports.

Further, the cloud platform may further terminate the service access authorization for the virtual machine. The termination of the service access authorization may be triggered after the user proactively initiates a termination application or the cloud platform determines that the user is in debt, or the like. The cloud platform delivers a deletion message to the access network element in which the virtual machine is located. The deletion message is used to delete the NAT rule of the virtual machine that is recorded on the access network element, delete the user information recorded in the cloud platform, and stop access authorization for the user. The cloud platform may reserve user data for a period of time, and provide a data copy service to the user. In a proper duration of validity, the user may select renewal and continue to use the service provided by the physical server.

Figure 6:
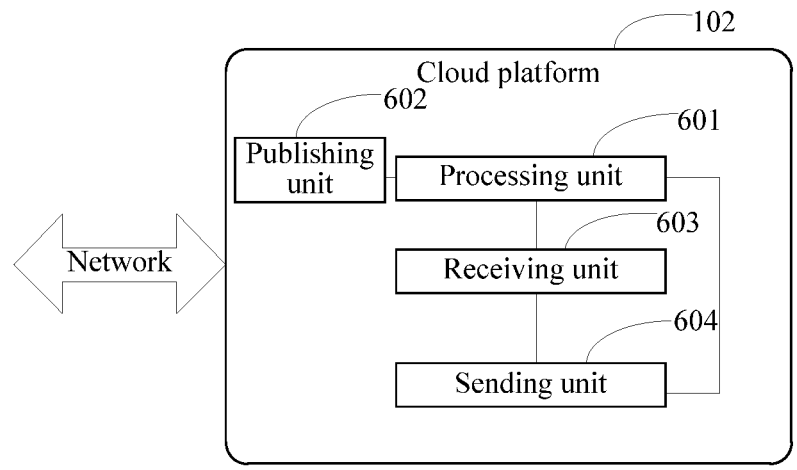
FIG. 6 is a schematic structural diagram of a cloud platform according to an embodiment of the present invention.

Corresponding to the cloud computing systems in FIG. 1A and FIG. 1B and the access procedures in FIG. 4 and FIG. 5, FIG. 6 is a schematic structural diagram of a cloud platform according to an embodiment of the present invention. The cloud platform includes a processing unit 601, a publishing unit 602, a receiving unit 603, and a sending unit 604.

The processing unit 601 is configured to: allocate, to a service, a publishing IP address and a publishing port that correspond to the service, and record a correspondence between the publishing IP address and the publishing port and an IP address and a port that are of a physical server running the service.

The publishing unit 602 is configured to publish the service.

The receiving unit 603 is configured to receive a service application request sent by a virtual machine.

The sending unit 604 is configured to send a NAT rule to an access network element of the virtual machine. The NAT rule includes the correspondence between the publishing IP address and the publishing port and the IP address and the port that are of the physical server running the service, and the virtual machine connects to a network of a cloud computing system by using the access network element.

Further, that the cloud platform externally publishes service information by using the publishing unit specifically includes:

the publishing unit 602 is specifically configured to: provide a service presentation interface to the virtual machine, and display service information, where the service information includes an external display address of the service.

The external display address includes a domain name corresponding to the service, or the publishing IP address and the publishing port that correspond to the service. The external display address may uniquely identify the service.

Still further, the cloud computing system further includes a DNS server. The DNS server is an internal DNS server of the cloud computing system. A host running the virtual machine, the cloud platform, and the DNS server are connected by using a network. After the cloud platform deploys the service and when the external display address of the service is the domain name corresponding to the service, the sending unit 604 is further configured to deliver, to the domain name system DNS server, a correspondence between the domain name and the publishing IP address and the publishing port.

The sending unit 604 is further configured to return a service application response to the virtual machine. The service application response carries the external display address.

The processing unit 601 is further configured to record authorization information of a user to which the virtual machine belongs. The authorization information of the user includes a user identifier, a virtual machine identifier, and an account and a password that are allocated to the user.

The receiving unit 603 is further configured to receive a virtual machine creation request.

The processing unit 601 is further configured to create another virtual machine for the user based on the virtual machine creation request.

The sending unit 604 is further configured to: after the another virtual machine is created, deliver the NAT rule to an access network element to which the another virtual machine connects.

The processing unit 601 is further configured to terminate service authorization for the virtual machine.

The sending unit 604 is further configured to send a deletion message to the access network element, to instruct the access network element to delete the NAT rule of the virtual machine.

Figure 7A:
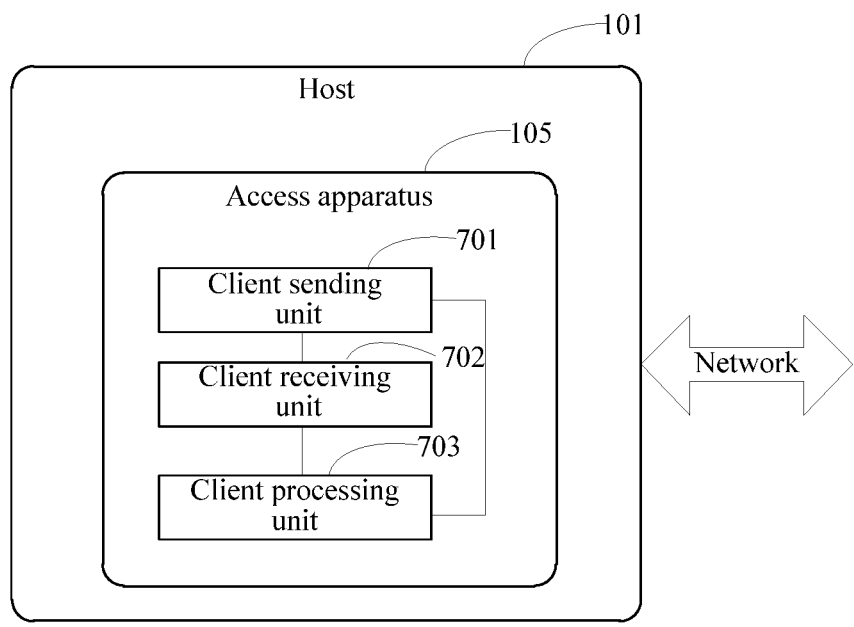
FIG. 7A is a schematic structural diagram of an access apparatus according to an embodiment of the present invention.
Figure 7B:
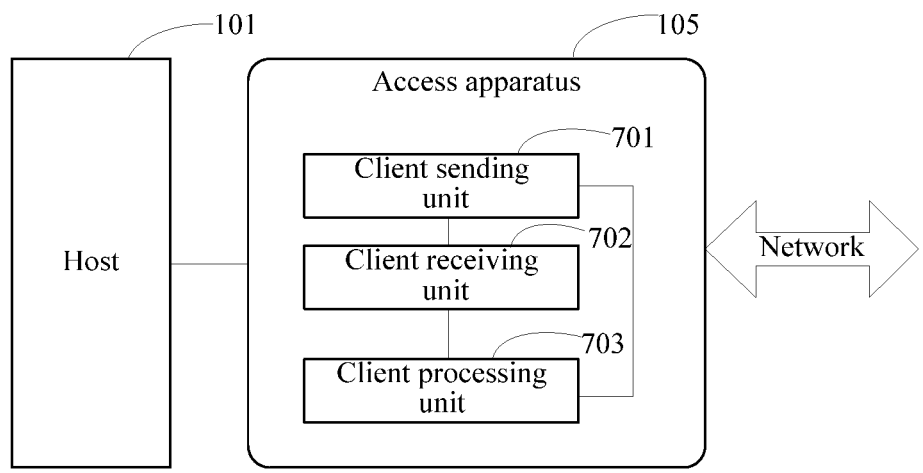
FIG. 7B is a schematic structural diagram of another access apparatus according to an embodiment of the present invention.

FIG. 7A and FIG. 7B each show an access apparatus according to an embodiment of the present invention, to implement a function of the access network element in the foregoing system. The access apparatus includes:

a client sending unit 701, configured to forward a service application request of a virtual machine to a cloud platform;

a client receiving unit 702, configured to receive a NAT rule of the virtual machine that is returned by the cloud platform after the cloud platform approves the service application request, where the NAT rule includes a correspondence between the publishing IP address and the publishing port and an IP address and a port that are of the physical server running the service, and the virtual machine connects to a network of a cloud computing system by using the access network element, where the client sending unit 701 is further configured to receive a service access request sent by the virtual machine, where a destination address of the service access request is the publishing IP address and the publishing port that corresponds to the service; and a client processing unit 703, configured to replace, according to the NAT rule, the destination address of the service access request with the IP address and the port that are of the physical server, where the client sending unit 701 is further configured to route the modified service access request to the physical server; and the client receiving unit 702 is configured to receive a service response message returned by the physical server.

Further, the client processing unit 703 is further configured to replace, according to the NAT rule, a source address of the service response message with the publishing IP address and the publishing port that correspond to the service.

The client sending unit 702 is further configured to send the modified service response message to the virtual machine.

As shown in FIG. 7A, the access apparatus may be a functional part on the host in the foregoing system, and a central processing unit on the host runs an instruction to implement the foregoing functions of the access apparatus; as shown in FIG. 7B, the access apparatus may be the top-of-rack switch in the foregoing system, and the top-of-rack switch may be a physical device independent of the host. In another possible design, the top-of-rack switch may be a physical part in the host. The foregoing cloud platform and the access apparatus may be implemented by using the computer device in FIG. 2.

An embodiment of the present invention further provides a computer storage medium, configured to store a computer software instruction used by the device shown in FIG. 6 and FIG. 7, where the computer storage medium includes a program designed for executing the foregoing method embodiments. A method for accessing, by a virtual machine, a service deployed on a physical server may be implemented by executing the stored program.

Based on the above, according to the method for a virtual machine to access a physical server, the apparatus, and the system provided in the embodiments of the present invention, a real IP address of the physical server on which a service is deployed may be shielded from the virtual machine, and a unified access mode is also provided to the virtual machine, thereby both ensuring network security of the cloud platform and increasing convenience of accessing the service by a user. Further, a same access mode is configured for a same service, so that complexity of deploying, operating, maintaining, and managing the service on the physical server is reduced, and the user does not need to pay attention to functions such as online, O&M, upgrade, and high availability of the service provided by the physical server. The virtual machine does not use a tunnel technology such as VXLAN to access the physical server, and transmission efficiency is higher. The access network element to which each virtual machine connects performs the NAT rule, thereby increasing concurrent processing efficiency of securely accessing a PAAS service by a mass of users.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step or operation, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another distribution form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, apparently, various modifications and combinations may be made to them without departing from the spirit and scope of the present invention. Correspondingly, the specification and accompanying drawings are merely examples of description of the present invention defined by the accompanying claims, and are considered as any of or all modifications, variations, combinations or equivalents that cover the scope of the present invention. Apparently, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:
1. A method for a virtual machine to access a physical server in a cloud computing system, the method comprising
 allocating, by a cloud platform to a service, a publishing IP address and a publishing port;

recording a correspondence between the publishing IP address and the publishing port and an IP address and a port that are of a physical server hosting the service;
publishing the service;
receiving, by the cloud platform, a service application request from a virtual machine, and
sending a NAT (network address translation) rule to an access network element of the virtual machine, wherein the NAT rule comprises the correspondence between the publishing IP address and the publishing port and the IP address and the port of the physical server hosting the service;
receiving, by the access network element, a service access request from the virtual machine, wherein a destination address of the service access request includes the publishing IP address and the publishing port corresponding to the service;
replacing, by the access network element according to the NAT rule, the destination address of the service access request with the IP address and the port of the physical server;
routing the modified service access request to the physical server;
receiving, by the access network element, a service response message from the physical server; and
sending the service response message to the virtual machine.

2. The method according to claim 1, wherein the publishing, by a cloud platform, the service comprises:
providing, by the cloud platform, a service presentation interface to the virtual machine, and
displaying service information, wherein the service information comprises an external display address of the service.

3. The method according to claim 2, wherein the external display address comprises a domain name corresponding to the service, or the publishing IP address and the publishing port corresponding to the service.

4. The method according to claim 3, wherein when the external display address of the service includes the domain name corresponding to the service, before the receiving, by the cloud platform, a service application request sent by a virtual machine, the method further comprises:
delivering, by the cloud platform, a correspondence between the domain name and the publishing IP address and the publishing port to a domain name system (DNS) server, so that when initiating a domain name parsing operation, the virtual machine obtains, based on the domain name, the publishing IP address and the publishing port corresponding to the service from the DNS server.

5. The method according to claim 2, wherein after the receiving, by the cloud platform, a service application request from a virtual machine, the method further comprises:
returning, by the cloud platform, a service application response to the virtual machine, wherein the service application response includes the external display address.

6. The method according to claim 5, wherein after the service application request is approved, the method further comprises:
recording, by the cloud platform, authorization information of a user to which the virtual machine belongs, wherein the authorization information of the user comprises a user identifier, a virtual machine identifier, and an account and a password that are allocated to the user.

7. The method according to claim 6, further comprising:
receiving, by the cloud platform, a creation request of the virtual machine,
creating another virtual machine for the user, and
delivering the NAT rule to an access network element to which the another virtual machine connects.

8. The method according to claim 1, further comprising:
terminating, by the cloud platform, service authorization for the virtual machine, and
sending a deletion message to the access network element, to instruct the access network element to delete the NAT rule of the virtual machine.

9. A cloud computing system, comprising:
a cloud platform;
a physical server having a service deployed therein; and
an access network element,
wherein the cloud platform is configured to:
allocate, to the service, a publishing IP address and a publishing port,
record a correspondence between the publishing IP address and the publishing port and an IP address and a port of the physical server,
publish the service,
receive a service application request from a virtual machine, and
send a NAT (network address translation) rule to the access network element, wherein the NAT rule comprises the correspondence between the publishing IP address and the publishing port and the IP address and the port of the physical server hosting the service, and
wherein the access network element is configured to
receive a service access request from the virtual machine, wherein a destination address of the service access request includes the publishing IP address and the publishing port that correspond to the service,
replace, according to the NAT rule, the destination address of the service access request with the IP address and the port of the physical server,
route the modified service access request to the physical server, and
receive a service response message from the physical server.

10. The system according to claim 9, wherein
a source address of the service response message includes the IP address and the port of the physical server; and
the access network element is further configured to:
replace, according to the NAT rule, the source address of the service response message with the publishing IP address and the publishing port that correspond to the service, and
send the modified service response message to the virtual machine.

11. The system according to claim 9, wherein the cloud platform is further configured to:
provide a service presentation interface to the virtual machine, and
display service information, wherein the service information comprises an external display address of the service.

12. The system according to claim 11, wherein
the external display address comprises a domain name corresponding to the service, or the publishing IP address and the publishing port corresponding to the service.

13. The system according to claim 12, wherein when the external display address of the service includes the domain name corresponding to the service:
- the cloud platform is further configured to deliver, to a domain name system (DNS) server, a correspondence between the domain name and the publishing IP address and the publishing port; and
- the virtual machine is configured to:
  - initiate a domain name parsing operation, and
  - obtain, based on the domain name, the publishing IP address and the publishing port that correspond to the service from the DNS server.

14. The system according to claim 11, wherein
the cloud platform is further configured to return a service application response to the virtual machine, wherein the service application response includes the external display address.

15. The system according to claim 14, wherein
the cloud platform is further configured to record authorization information of a user to which the virtual machine belongs, wherein the authorization information of the user comprises a user identifier, a virtual machine identifier, and an account and a password that are allocated to the user.

16. The system according to claim 15, wherein the cloud platform is further configured to:
- receive a creation request of the virtual machine,
- create another virtual machine for the user, and
- deliver the NAT rule to an access network element to which the another virtual machine connects.

17. The system according to claim 1, wherein the cloud platform is further configured to:
- terminate service authorization for the virtual machine, and
- send a deletion message to the access network element, to instruct the access network element to delete the NAT rule of the virtual machine.

18. A method for a virtual machine to access a physical server in a cloud computing system, the method comprising
- forwarding, by an access network element, a service application request of a virtual machine to a cloud platform;
- receiving, by the access network element, a NAT (network address translation) rule of the virtual machine that is returned by the cloud platform, wherein the NAT rule comprises a correspondence between a publishing IP address and a publishing port and an IP address and a port of the physical server hosting the service;
- receiving, by the access network element, a service access request from the virtual machine, wherein a destination address of the service access request includes the publishing IP address and the publishing port corresponding to the service;
- replacing, by the access network element according to the NAT rule, the destination address of the service access request with the IP address and the port of the physical server;
- routing the modified service access request to the physical server; and
- receiving a service response message returned by the physical server.

19. The method according to claim 18, wherein a source address of the service response message includes the IP address and the port that are of the physical server, and the method further comprises:
- replacing, by the access network element according to the NAT rule, the source address of the service response message with the publishing IP address and the publishing port that correspond to the service, and
- sending the modified service response message to the virtual machine.

20. An access apparatus, comprising:
a processor; and
a memory for storing instructions, which when executed by the processor, causing the processor to perform operations, the operations including:
- forwarding a service application request associated with a service from a virtual machine to a cloud platform;
- receiving a NAT (network address translation) rule of the virtual machine that is returned by the cloud platform after the cloud platform approves the service application request, wherein the NAT rule comprises a correspondence between the publishing IP address and the publishing port and an IP address and a port of the physical server hosting the service, wherein
- receiving a service access request from the virtual machine, wherein a destination address of the service access request includes the publishing IP address and the publishing port that correspond to the service;
- replacing, according to the NAT rule, the destination address of the service access request with the IP address and the port of the physical server;
- routing the modified service access request to the physical server;
- receiving a service response message from the physical server.

* * * * *